United States Patent
Touch et al.

(10) Patent No.: US 7,653,746 B2
(45) Date of Patent: Jan. 26, 2010

(54) ROUTABLE NETWORK SUBNET RELOCATION SYSTEMS AND METHODS

(75) Inventors: Joseph Dean Touch, Manhattan Beach, CA (US); Lars Eggert, Playa del Rey, CA (US); Yu-Shun Wang, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 759 days.

(21) Appl. No.: 10/632,249

(22) Filed: Aug. 1, 2003

(65) Prior Publication Data

US 2004/0034695 A1 Feb. 19, 2004

Related U.S. Application Data

(60) Provisional application No. 60/400,822, filed on Aug. 2, 2002.

(51) Int. Cl.
*G06F 15/16* (2006.01)
*G06F 15/173* (2006.01)
*H04L 12/28* (2006.01)
*H04L 12/56* (2006.01)
*G06F 9/00* (2006.01)
*G06F 17/00* (2006.01)

(52) U.S. Cl. .............. 709/245; 709/225; 709/229; 709/236; 709/239; 726/11; 726/15; 370/399; 370/409

(58) Field of Classification Search ......... 709/225–229, 709/236, 239, 245; 726/11–15; 370/397, 370/399, 395.53, 409
See application file for complete search history.

(56) References Cited

U.S. PATENT DOCUMENTS

| 6,141,690 | A  | * | 10/2000 | Weiman ............... 709/228 |
| 6,766,371 | B1 | * | 7/2004  | Hipp et al. ........... 709/225 |
| 6,981,278 | B1 | * | 12/2005 | Minnig et al. ......... 726/12  |
| 6,992,994 | B2 | * | 1/2006  | Das et al. ............ 370/328 |
| 7,000,012 | B2 | * | 2/2006  | Moore et al. .......... 709/220 |
| 7,020,720 | B1 | * | 3/2006  | Donahue et al. ........ 709/245 |
| 7,028,335 | B1 | * | 4/2006  | Borella et al. ........ 726/11  |
| 7,032,242 | B1 | * | 4/2006  | Grabelsky et al. ...... 726/11  |
| 7,099,957 | B2 | * | 8/2006  | Cheline et al. ........ 709/245 |
| 7,154,891 | B1 | * | 12/2006 | Callon ................ 370/392 |

(Continued)

OTHER PUBLICATIONS

Srisuresh, P. and Egevang, K. "Traditional IP Network Address Translator (Traditional NAT)," RFC 3022, Jan. 2001, pp. 1-19.*

(Continued)

*Primary Examiner*—Vivek Srivastava
*Assistant Examiner*—Melvin H Pollack
(74) *Attorney, Agent, or Firm*—McDermott Will & Emery LLP

(57) ABSTRACT

A system and method for relocating a subnet to a remote location includes a tether router coupled to an anchor router via a link. The tether router is coupled to a plurality of nodes, each node corresponding to a network address of a plurality of network addresses allocated to a user. The plurality of network addresses is allocated to the user by a lease broker. The link may include a private tunnel for traversing a mechanism that otherwise hinders communication from the tether router to the anchor router, such as a network address translation (NAT) mechanism.

12 Claims, 13 Drawing Sheets

U.S. PATENT DOCUMENTS

| | | | |
|---|---|---|---|
| 7,155,518 B2 * | 12/2006 | Forslow | 709/227 |
| 7,174,564 B1 * | 2/2007 | Weatherspoon et al. | 726/2 |
| 7,181,612 B1 * | 2/2007 | Pellacuru et al. | 713/153 |
| 7,197,550 B2 * | 3/2007 | Cheline et al. | 709/223 |
| 7,200,662 B2 * | 4/2007 | Hasan et al. | 709/226 |
| 7,313,819 B2 * | 12/2007 | Burnett et al. | 726/15 |
| 7,379,465 B2 * | 5/2008 | Aysan et al. | 370/409 |
| 7,421,736 B2 * | 9/2008 | Mukherjee et al. | 726/15 |
| 7,444,398 B1 * | 10/2008 | Matthews | 709/224 |
| 7,450,560 B1 * | 11/2008 | Grabelsky et al. | 370/352 |
| 7,464,177 B2 * | 12/2008 | Shimizu | 709/238 |
| 7,574,737 B1 * | 8/2009 | Loh | 726/15 |
| 2002/0038371 A1 * | 3/2002 | Spacey | 709/227 |
| 2002/0129165 A1 * | 9/2002 | Dingsor et al. | 709/246 |
| 2003/0055990 A1 * | 3/2003 | Cheline et al. | 709/229 |
| 2003/0135616 A1 * | 7/2003 | Carrico et al. | 709/225 |

OTHER PUBLICATIONS

Senie, D. "Network Address Translator (NAT)—Friendly Application Design Guidelines," RFC 3235, Jan. 2002, pp. 1-13.*

Tsirtsis, George and O'Neill, Alan. "NAT Bypass for End 2 End 'Sensitive' Applications," Internet Draft 00, Jan. 1998, pp. 1-6.*

Hain, T. "Architectural Implications of NAT," RFC 2993, Nov. 2000, pp. 1-29.*

Srisuresh, P. "Security Model with Tunnel-Mode IPsec for NAT Domains," RFC 2709, Oct. 1999, pp. 1-11.*

Srisuresh, P. et al. "DNS Extensions to Network Address Translators (DNS_ALG)," RFC 2694, Sep. 1999, pp. 1-29.*

Jamhour, E. and Storoz, S. "Implementing Wireless Networks with Transition Mechanisms," Proceedings of the 22nd International Conference in the Chilean Computer Science Society (SCCC), 2002, pp. 72-81.*

Peterson, L.L. et al. "OS Support for General-Purpose Routers," Proceedings of the Seventh Workshop on Hot Topics in Operating Systems, Mar. 30, 1999, pp. 38-43.*

Demizu, Noritoshi and Yamaguchi, Suguru. "DDT—A Versatile Tunneling Technology," Selected Papers of the Annual Conference on Internet Society / 5th Joint European Networking Conference, 1994, pp. 493-502.*

Anerousis, N. and Hjalmtysson, G. "Service Level Routing on the Internet," Global Telecommunications Conference (GLOBECOM), vol. 1B, Dec. 9, 1999, pp. 553-559.*

Olechna, E. et al. "Virtual Private Network Issues Using Satellite Based Networks," Communications for Network-Centric Operations: Creating the Information Force, IEEE Military Communications Conference, vol. 2, 2001, pp. 785-789.*

* cited by examiner

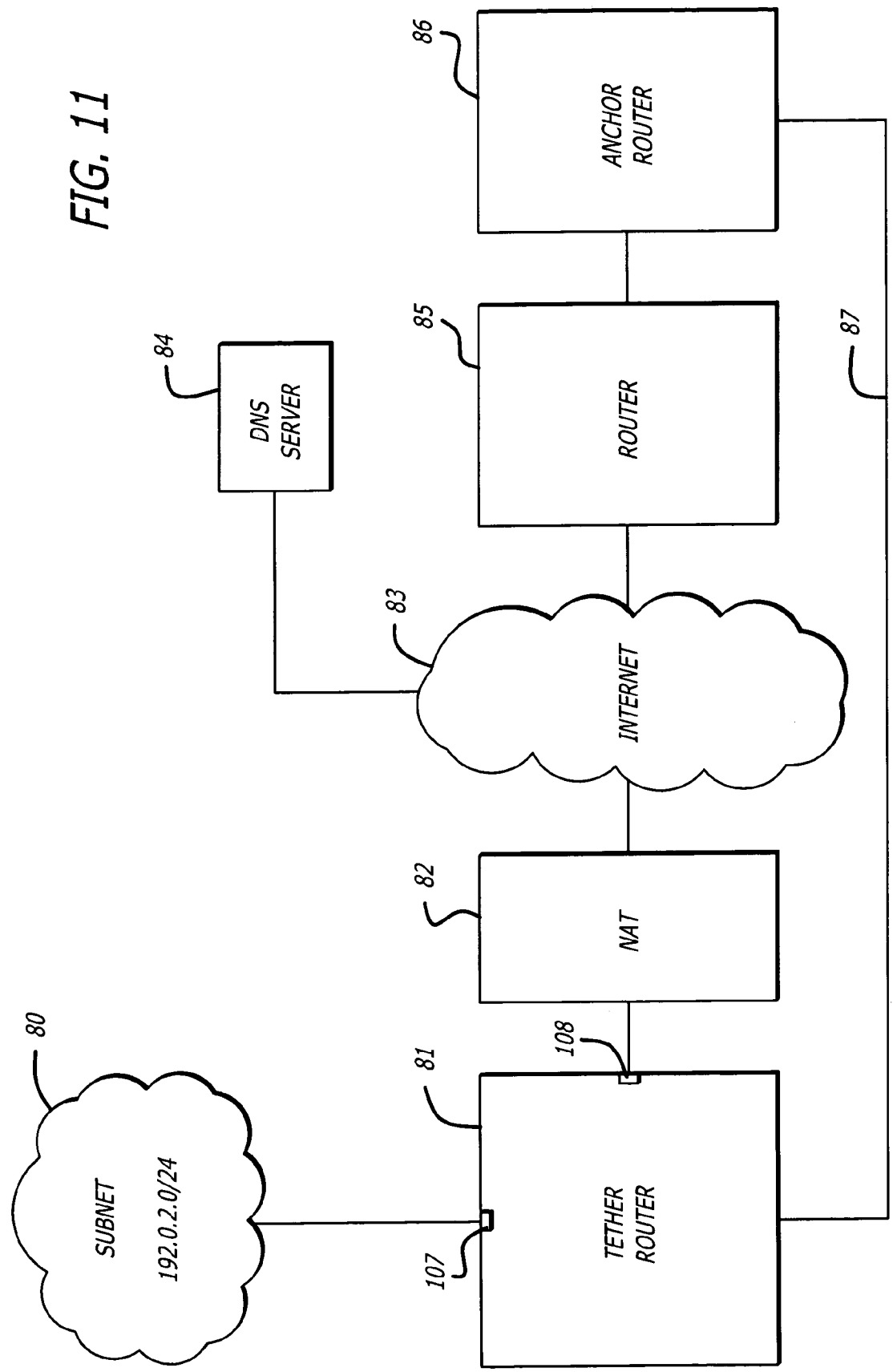

ROUTABLE NETWORK SUBNET RELOCATION SYSTEMS AND METHODS

CROSS-REFERENCE TO RELATED APPLICATION

This application claims priority under 35 U.S.C. § 119(e) to provisional application having Ser. No. 60/400,822 filed Aug. 2, 2002, entitled "System for Network Subnet Relocation," the entire content of which is hereby incorporated by reference.

GOVERNMENT'S INTEREST IN APPLICATION

This invention was made with government support under Contract Nos. F30602-98-1-0200 and F30602-01-2-0529 awarded by the Air Force Research Laboratory. The government has certain rights in the invention.

BACKGROUND

1. Field

The present invention concerns relocating network subnets, i.e., portions of a network to a location remote from the original network.

2. Background

Often it is desirable to run applications on a network or device in a location remote from the location where such applications are ordinarily run. For example, a programmer may wish to run an application at a location remote from a usual "home" network in which sites containing services necessary for that application are available. The programmer in this instance may face a quandary. Services necessary for the proper execution of the application at the remote location or device are available from the programmer's "home" network, but, for whatever reason, may be unavailable for the application. That is, the programmer running the application on the remote location can not take advantage of necessary services that are available from the "home" network. Such services may either be located on the "home" network, or if located elsewhere, accessible from the "home" network.

The connection failure may result from a wide variety of obstacles. In the most simple scenario, the "home" network and remote device or network may not be connected together. As another illustration, communications between the networks may not be routable due to incompatible network protocols, unfulfilled encryption requirements, or intervening devices in the network link, such as firewalls or network translation devices, etc. that tend to prevent or obstruct the routing of data between the networks. Alternatively, the network infrastructure may in some way be inadequate for delivery of such services to the remote network or the coordination of services between networks. Another scenario is that the remote location may not have enough network addresses to support all the devices necessary to run the applications. The programmer faces inherent obstacles and potentially significant network and service configuration problems.

A common infrastructure where such problems abound is the Internet. As a simple illustration, a programmer may wish to run a presentation at a remote site on the internet, such as a corporate or governmental intranet. A seamless execution of the demonstration may require that the applications that are the subject of the demonstration have access to other services on the Internet, such as a file server, DNS server, or the like, wherein the latter services are located at remote sites. Just as well, various services on the Internet may require access to these remote programs being run at the remote location on the exemplary intranet. The programmer in this situation would ideally like to have "true" Internet services at the remote location, meaning seamless access to necessary Internet sites (and vice versa) for the purposes of running the presentation.

Ordinarily, communications occur on the Internet through the routing of IP packets with a transport protocol like TCP or UDP. However, the corporate intranet may reside behind one or more devices that make such communication impractical or impossible. Such devices may include a firewall, a network address translation (NAT) box, or another device that otherwise obfuscates services or hinders communication between the Internet and the corporate intranet.

A NAT box is a mechanism that, among other functions, runs an algorithm that enables a network to use one set of IP addresses for internal traffic and another set for external traffic. In many cases, the NAT box itself has only one IP address known to components on the Internet. External sites on the Internet thus cannot identify, or associate with a routable IP address, components located behind the NAT box. Accordingly, these external sites can not initiate communicate with the internal sites or components behind the NAT box using standard IP routing. When running an application or site on the corporate intranet, necessary or desirable services residing on the Internet therefore can not route data between components on the corporate intranet or aid in the execution of the application. Likewise, depending on the network configuration, the application being run on the corporate intranet may have problems initiating communications with sites on the Internet for needed services. Communication may be desirable for many reasons, such as to transmit results of an application to a local site, to resolve or obtain network addresses, to send or receive e-mails, to use remote databases or libraries, to call remote code or libraries for local execution, etc.

Virtual private networks ("VPNs") can often take advantage of the principles of encapsulation to provide users on a remote network with secure access to another network. Encapsulation is the process of inserting the components of a first network protocol within the packets of a second network protocol. Unfortunately, traditional VPNs only provide for the allocation of a single network address. As such, a remote subnet cannot be established. Moreover, VPNs lack continuous connectivity properties; that is, VPN connections need to be re-established whenever, for example, an address parameter changes. As an illustration of this fact, in accessing a VPN through a cable modem, the VPN may need to be torn down and re-established when the IP address at the cable modem interface changes.

Accordingly, a need exists in the art to configure and allocate a remote network such that the remote network has access to necessary services and sites without being obscured by firewalls and other devices that hinder communication, and such that communications on the remote network can remain independent of underlying networks.

SUMMARY

A system and method relocates network subnets. In one aspect, a local or "home" network is coupled to an anchor router. The anchor router is coupled via a link to a tether router. The tether router is coupled to a subnet. Either the subnet or link may be preconfigured or negotiated on demand. The link may in one aspect be secure, and may include one or more physical or virtual connections. In another aspect, a remote subnet is configured by lease wherein delegation of the subnet is performed on demand. A lease broker is contacted to obtain a leased subnet. The tether router and anchor router then connect via a link, which link is configured appropriate to the leased subnet. The lease broker mechanism may reside in separate or unrelated devices, or it may reside in the same device as the anchor router. In another aspect, the link is virtual and set up as a tunnel. The tunnel may include one or more physical links or virtual links. Multiple leases may occur in one or more operations. Similarly, multiple virtual encapsulation tunnels may be established with one tether router. In yet another aspect of the invention, a system and method is provided wherein a block of routable, contiguous addresses are allocated at a remote location and a tunnel is established between the addresses at the remote location and a local network. One or more services, or the appropriate routing, are then set up at each end of the tunnel to establish globally routable addresses and seamless access to services resident on the local network (e.g., a collection of related web sites on the Internet) and the remote subnet. In another aspect, a remote subnet and tunnel is established to traverse a NAT box, firewall, or other service-obfuscating device(s). Through the use of the remote subnet, "real" Internet service is thereby provided to components on a network otherwise obscured from direct communications with remote Internet sites. In another aspect, the configuration of the subnet is maintained, and the tunnel is adapted to re-establish its connection as a result of changing address parameters or other variables. In still another aspect, an apparatus is disclosed, such as a PC or portable computing device, which includes a tether router configured to connect to a remote subnet and a processor configured to establish a tunnel between the tether router and a remotely located anchor router. In yet another aspect, a remote subnet is established in part to isolate traffic on the remote subnet from unrelated or insecure traffic on an underlying remote network.

Other embodiments of the present invention will become readily apparent to those skilled in the art from the following detailed description, wherein it is shown and described only certain embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIG. 11 is a drawing of a configuration of a remote subnet for communication with the Internet in accordance with an embodiment of the present invention.

DETAILED DESCRIPTION

Figure 1:
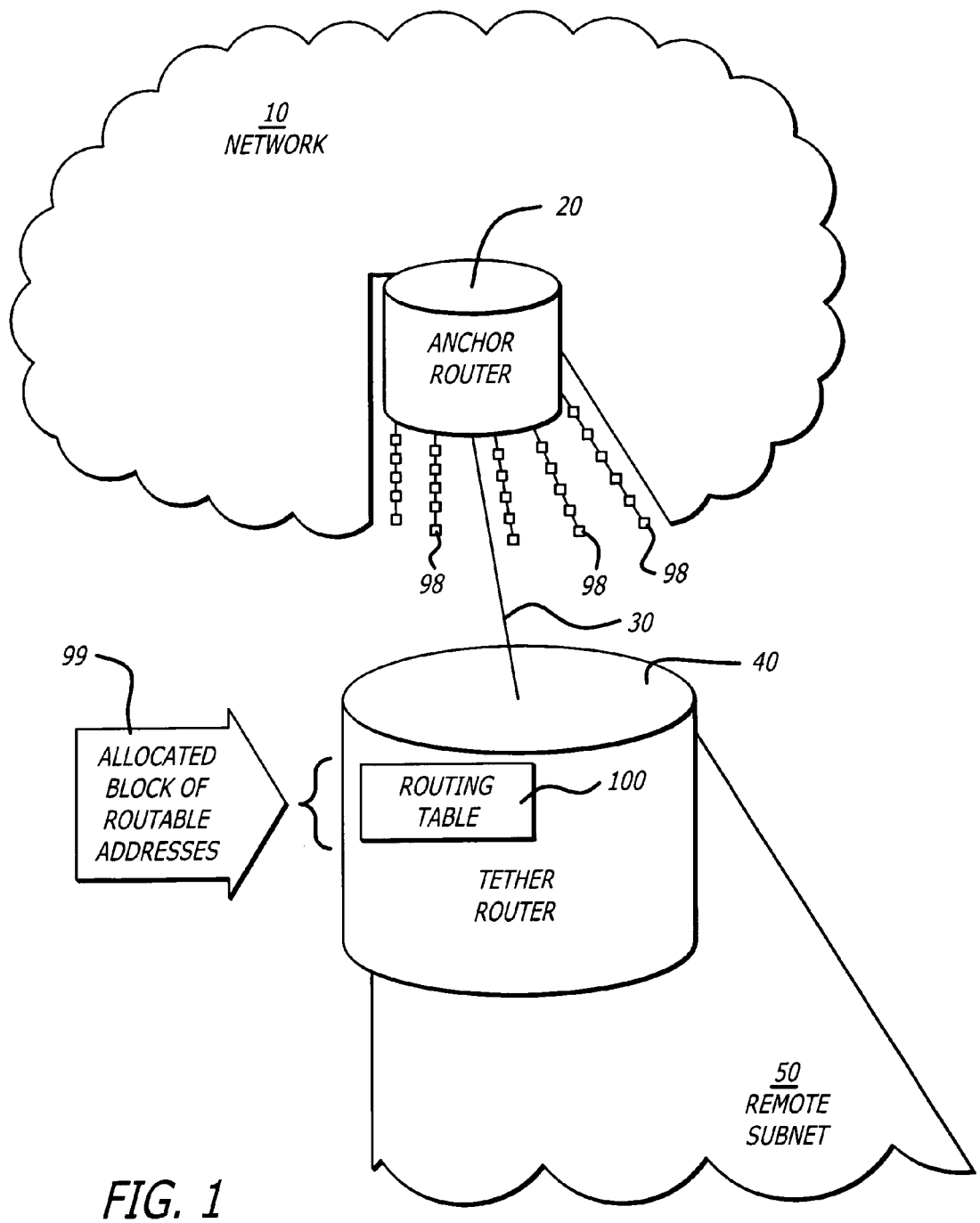
FIG. 1 is an illustration of the components of subnet relocation in accordance with an embodiment of the present invention.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention. In addition, for the purposes of this disclosure, the term "coupled" means "connected to" and such connection can either be direct or, where appropriate in the context, can be indirect, e.g., through intervening or intermediary devices or other means.

The present invention provides a system, method and apparatus for making remote a network subnet, and for making remote a block of routable network addresses. While certain embodiments of the invention are described in the context of the Internet, the invention is generally applicable to all types of network environments. Through the principles of the present invention, a block of contiguous, routable addresses is allocated remotely to form a subnet. The subnet may comprise a series of connected nodes that comprise various resources and services. In one embodiment, each node on the subnet corresponds to one of the plurality of allocated addresses from the block. Where the Internet is involved, the resources and services in the subnet may be used to provide Internet services to a device on a network (such as a LAN, intranet, etc.) obscured by a firewall, NAT, or other mechanism that impairs global routability.

Seamless applications may be run in a remote location on the subnet. The subnet may attach to devices on a network such as a local area network, wide area network, or corporate or governmental intranet, during the course of which resources and service from the Internet may be directly accessed via the subnet. Using the principles of the present invention, web sites that are ordinarily local to the programmer may communicate with sites on the remote subnet—and hence with a device coupled to the subnet or part of the subnet—as if the subnet were local to those sites. In essence, an "extension cord" to those sites is established via the subnet. In one embodiment, the sites to which the programmer desires access are effectively reproduced at the programmer's remote location via the subnet, which is coupled to the sites by a link. The programmer may then run applications at a remote location and communicate with the sites, using the subnet, as if they were local to the remote network.

Through the use of the tunneling technique as described further herein, one embodiment of the present invention provides the ability of the remote subnet to traverse services on a network, such as a firewall, network address translation mechanism, or the like, and instead directly access services on the Internet. (The mechanism which hinders service may vary depending on the network configuration, and may be in software or in hardware.) In kind, applicable services on the Internet with the appropriate permissions may directly access the individual nodes on a network coupled to, or forming part of, the subnet (such as one or more devices on a corporate intranet), and thereby traverse an intervening firewall or other device that may otherwise prevent that communication from occurring.

"Subnet relocation" is a term for relocating network subnets to a location remote from the original network. A "network subnet" or "subnet" can be a portion of a network. A "relocated network subnet" may act as an effective extension of the portion of the network to a remote (relocated) place. In essence, a relocated network subnet is configured such that it "mirrors" a first set of nodes of one network to a second set of nodes at a second network in a remote location. This mirroring capability and the flexibility and utility of the relocated network subnet are made possible, in part, through the allocation of a block of routable network addresses for use at the remote location. In an embodiment involving the Internet, these addresses may be known, static IP addresses. Such addresses may be used, among other purposes and depending on the configuration, to correspond to nodes on the relocated subnet.

In one embodiment, data traffic that is transmitted by some arbitrary node on an unrelated network and intended for a host device on the first set of nodes is forwarded to a corresponding host or location on the remote subnet. Similarly, data that is transmitted from a node on the remote subnet is forwarded to its corresponding device at the first set of nodes. The network subnet in this embodiment may be the collection of nodes at the first location, and the relocated network subnet may be the collection of nodes at the second, remote location. The relocated subnet of this embodiment effectively reproduces the set of nodes at the first location. In the context of the Internet, the remote subnet may use IP addresses that are fixed and globally routable. In general, any appropriately configured device on the Internet may be able to communicate with a node on the remote subnet. In configuring a remote subnet in the context of the Internet, among other things, a DNS server may be used to associate the fixed IP addresses with the domain of the subnet.

FIG. 1 depicts a relocated network subnet. A network 10 is coupled to an anchor router 20. Network 10 includes a collection of nodes 98, which may be a portion of network 10. The collection of nodes 98 may be considered a "local" subnet to be relocated to a remote subnet 50. The number of nodes in the collection 98 may vary widely depending on the configuration. Anchor router 20 is connected to a remote tether router 40 via a link 30. The remote tether router is coupled to the remote subnet 50. Subnet 50 may be either preconfigured or negotiated. Both routers may include or incorporate additional functionality, such as that described in connection with the embodiments below. In one embodiment, subnet 50 is allocated a number of appropriate addresses by some mechanism. Link 30 may be a physical link, such as a dial-up phone line, Ethernet, line-of-sight optical, etc. Alternatively, link 30 may be a virtual link, such as a tunnel. Either way, link 30 provides communication between anchor router 20 and tether router 40. Link 30 may be preconfigured or negotiated on demand.

Tether Router

Figure 2:
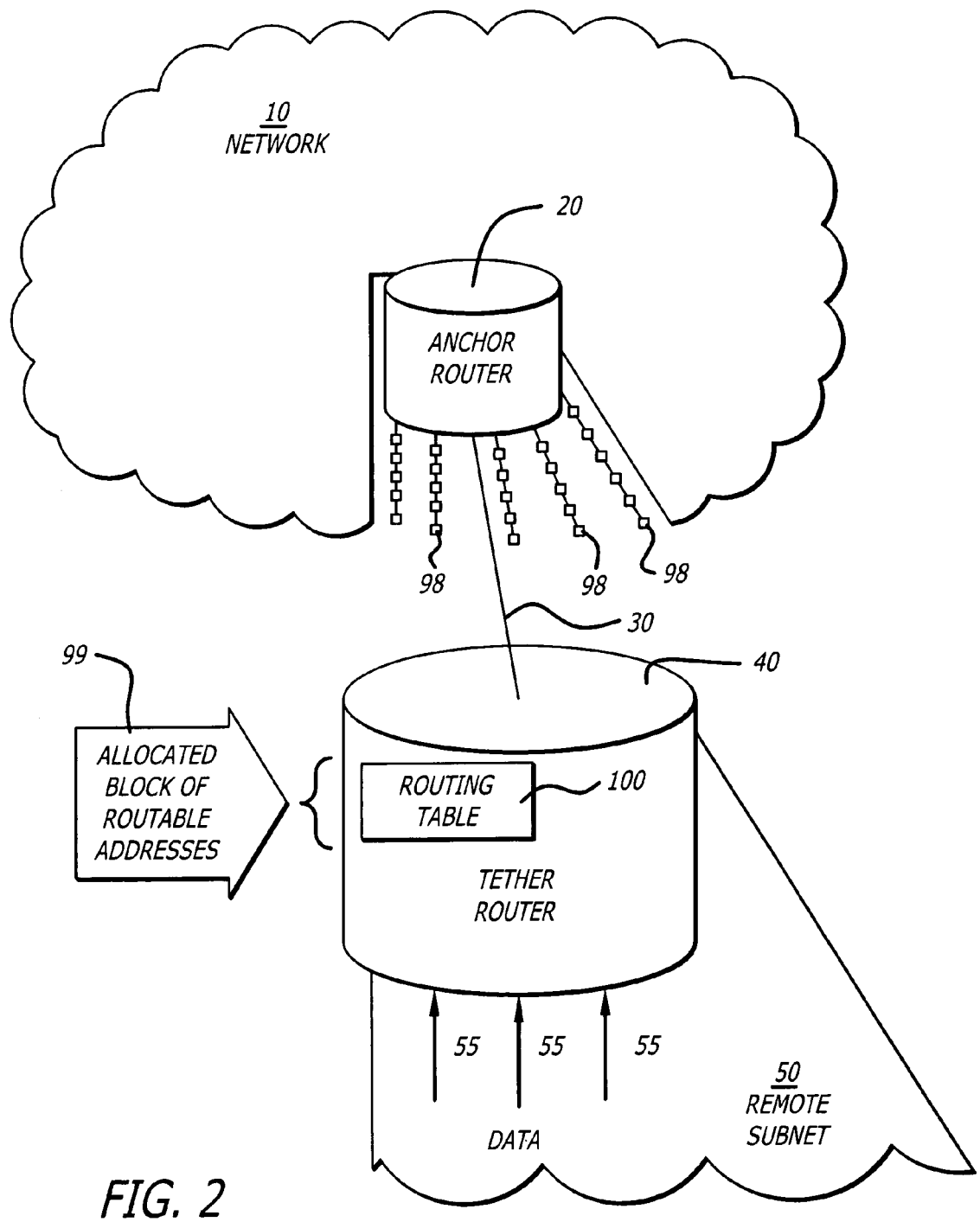
FIG. 2 is an illustration of the components of subnet relocation with one exemplary function of the tether router in accordance with an embodiment of the present invention.

The function of the tether router 40 in the most basic embodiment is to route data to and from the relocated subnet 50 via the link 30. Tether router 40 may be composed of a single device, or of a plurality of devices, depending on the implementation. Tether router 40 may transmit data 55 from subnet 50 that is addressed to non-subnet locations back to anchor router 20 over link 30. This function is illustrated in FIG. 2. Data 55 comes from a device in subnet 50 and is routed through tether router 40 over link 30 and through anchor router 20 to its destination.

Figure 3:
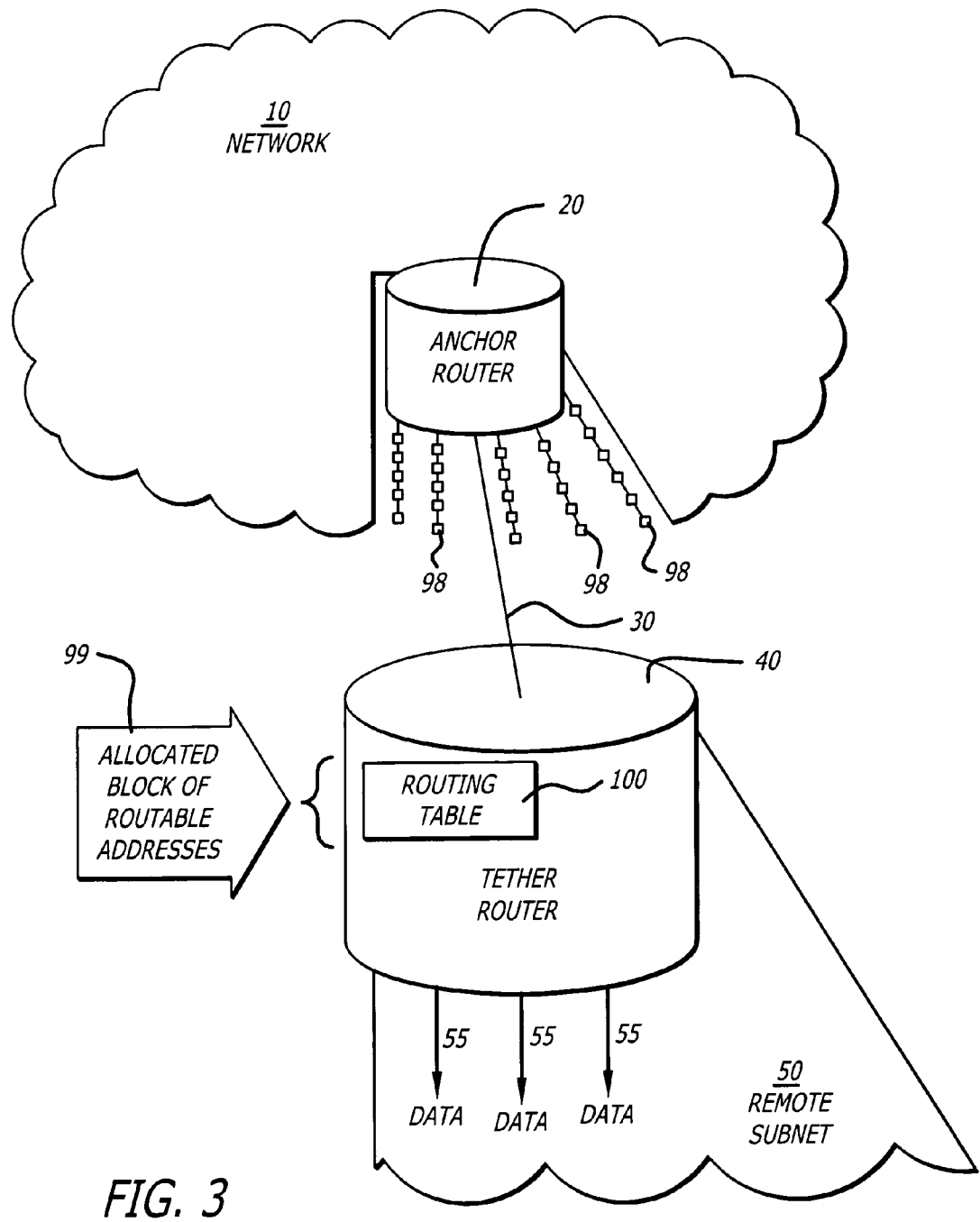
FIG. 3 is a drawing of the components of subnet relocation with another exemplary function of the tether router in accordance with an embodiment of the present invention.
Figure 4:
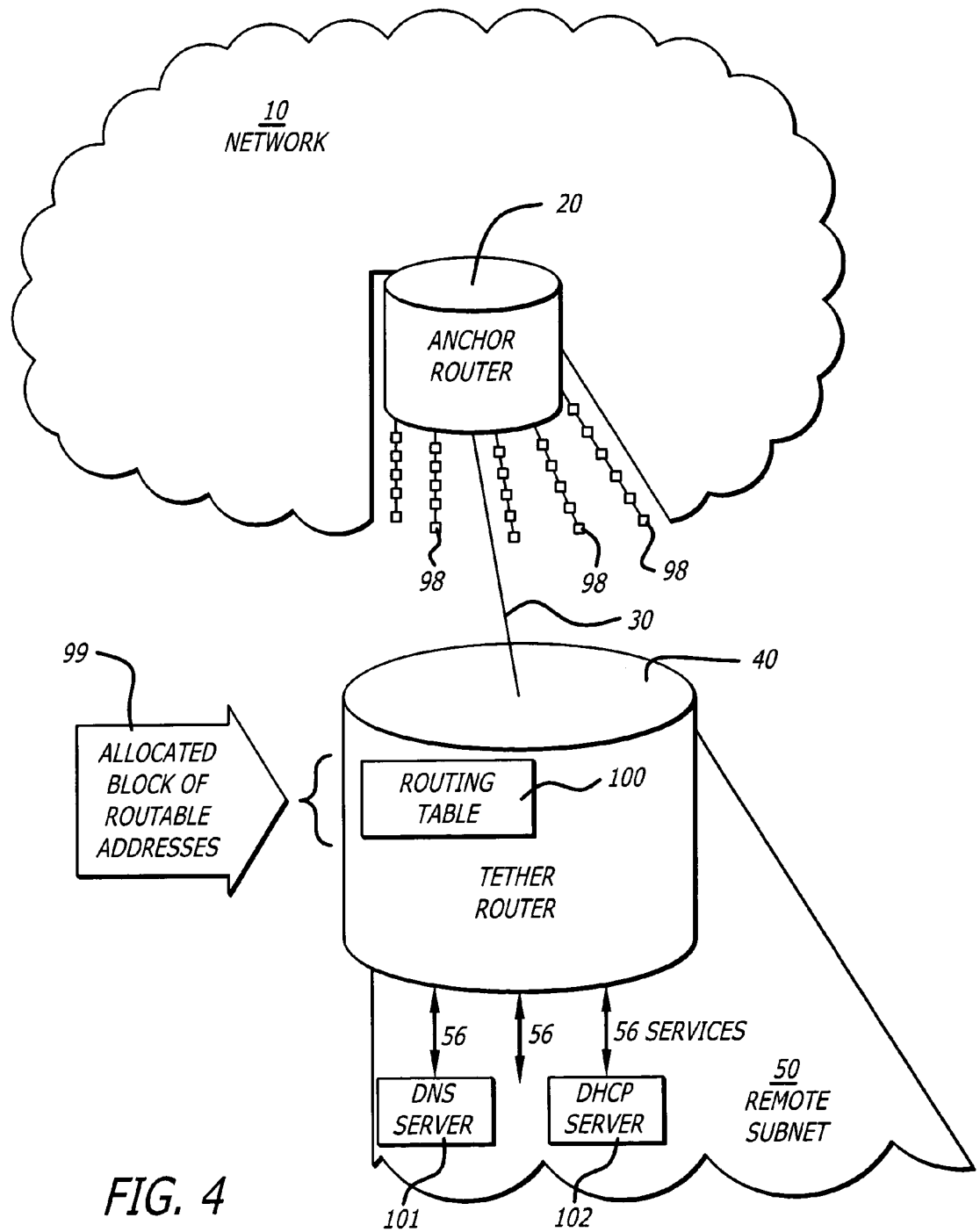
FIG. 4 is a drawing of the components of subnet relocation with another exemplary function of the tether router in accordance with an embodiment of the present invention.
Figure 5:
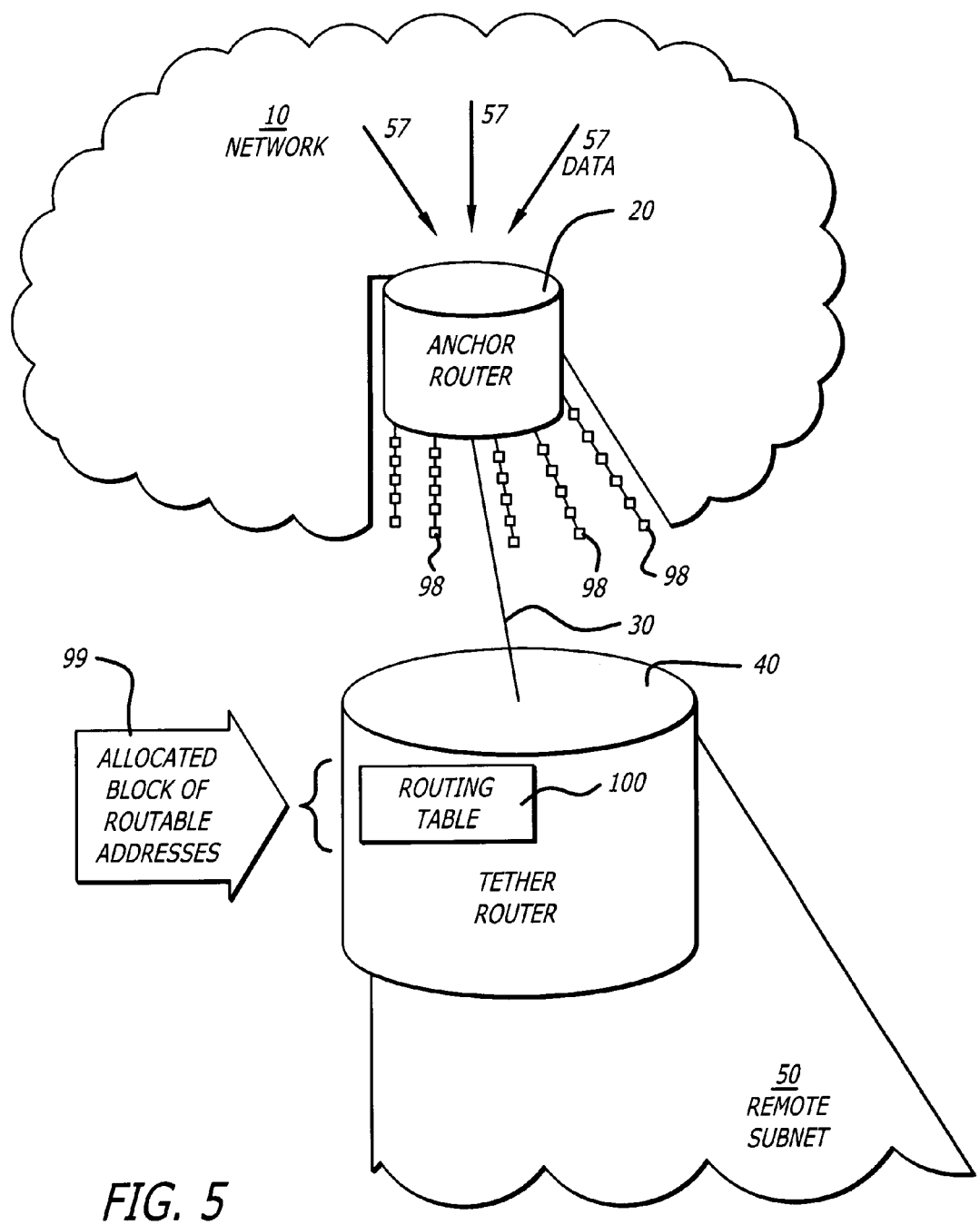
FIG. 5 is a drawing of the components of subnet relocation with an exemplary function of the anchor router in accordance with an embodiment of the present invention.

Tether router 40 may also transmit data 55 received on link 30 and addressed to a location in subnet 50. This function is shown in FIG. 3. Further, tether router 40 may provide any number of other services local to subnet 50, as conceptually illustrated in FIG. 4 by lines 56. Such services might include, for example, a DHCP ("Dynamic Host Configuration Protocol") server 102, a DNS ("Domain Name Service") server 101, and other services (not shown) such as a web cache, a file server, an SMTP ("Simple Mail Transfer Protocol") server, etc. These services need not reside directly on tether router 40, but may be accessible by tether router 40. Tether router 40 may enable configuration of the services 56 or it may enhance remote operations by routing necessary services from the network 10 via anchor router 20 and link 30 to subnet 50. Tether router 40 may assist in enabling configuration of the link 30 or in routing of data between tether router 40 and anchor router 20.

As shown in FIGS. 1-7, a block of routable network addresses are allocated to the remote subnet 50, as illustrated conceptually by arrow 99. The network addresses in this embodiment may be placed in the routing table of the tether router; however, other means may be used to store the allocated block of network addresses. In this embodiment, the network addresses, or a portion thereof, may be used to correspond or "map" to the collection of nodes 98. Depending on the configuration, certain network addresses of the allocated block may be used for other purposes, such as for identifying services coupled directly or indirectly to tether router 40, for identifying virtual devices for configuration purposes. Not all IP addresses in the allocated block need by actually used. Tether router 40 may be composed of more than one router, and more than one routing table may be used to store the network addresses. Further, in certain embodiments, the routing functionality of the tether router 40 may be performed exclusively in hardware or software, or a combination thereof. In an embodiment involving the Internet, the block of addresses may be static IP addresses, such as a block assigned or leased by a company to a user for the purpose of establishing a remote subnet (see below). One or more DNS servers may be set up, such as one connected to anchor router 40, to enable forward lookups of these addresses. (One ore more DNS servers may also be coupled to the tether router at the remote location). The operation of the tether router and the utilities of the configurations shown in FIGS. 1-4 are discussed further below in connection with various embodiments.

Anchor Router

The function of the anchor router in the most basic embodiment is to route data to and from the network 10 via the link 30. The anchor router 20 effectively acts as the coordination entrypoint for subnet 50 to the rest of the network 10. As with tether router 40, anchor router 20 may consist of a single physical device, or a plurality of devices. Anchor router 20 may perform various functions. First, referring to FIG. 5, anchor router 20 may transmit data 57 from the rest of network 10 to tether router 40 over link 30. The data 57 may then be delivered to a service, site, or other address on subnet 50.

Figure 6:
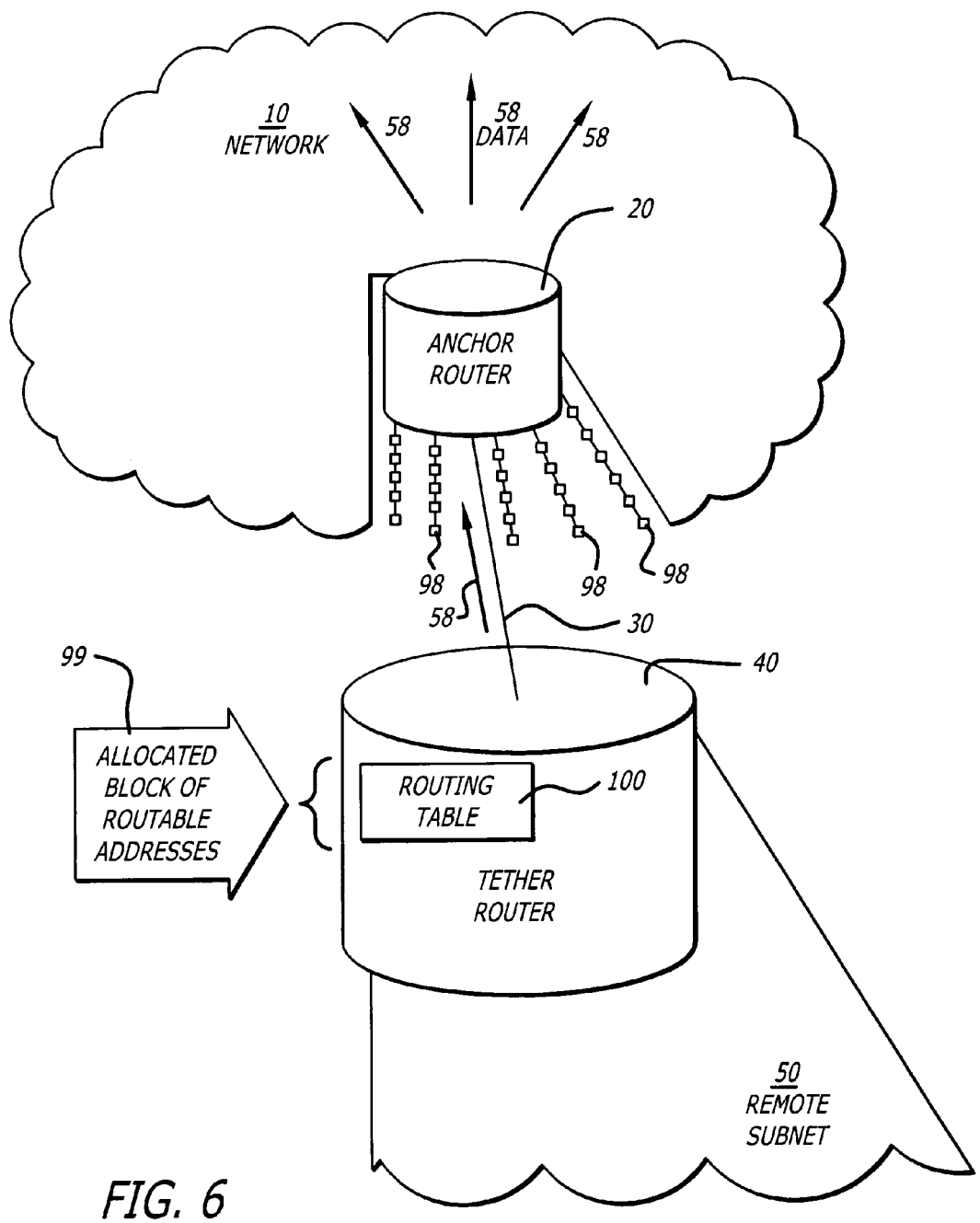
FIG. 6 is a drawing of the components of subnet relocation with another exemplary function of the anchor router in accordance with an embodiment of the present invention.

Referring to FIG. 6, anchor router 20 may also transmit data 58 received on link 30 to the rest of network 10. The data 58 may be addressed to any node on network 10, or to anchor router 20 itself.

Figure 7:
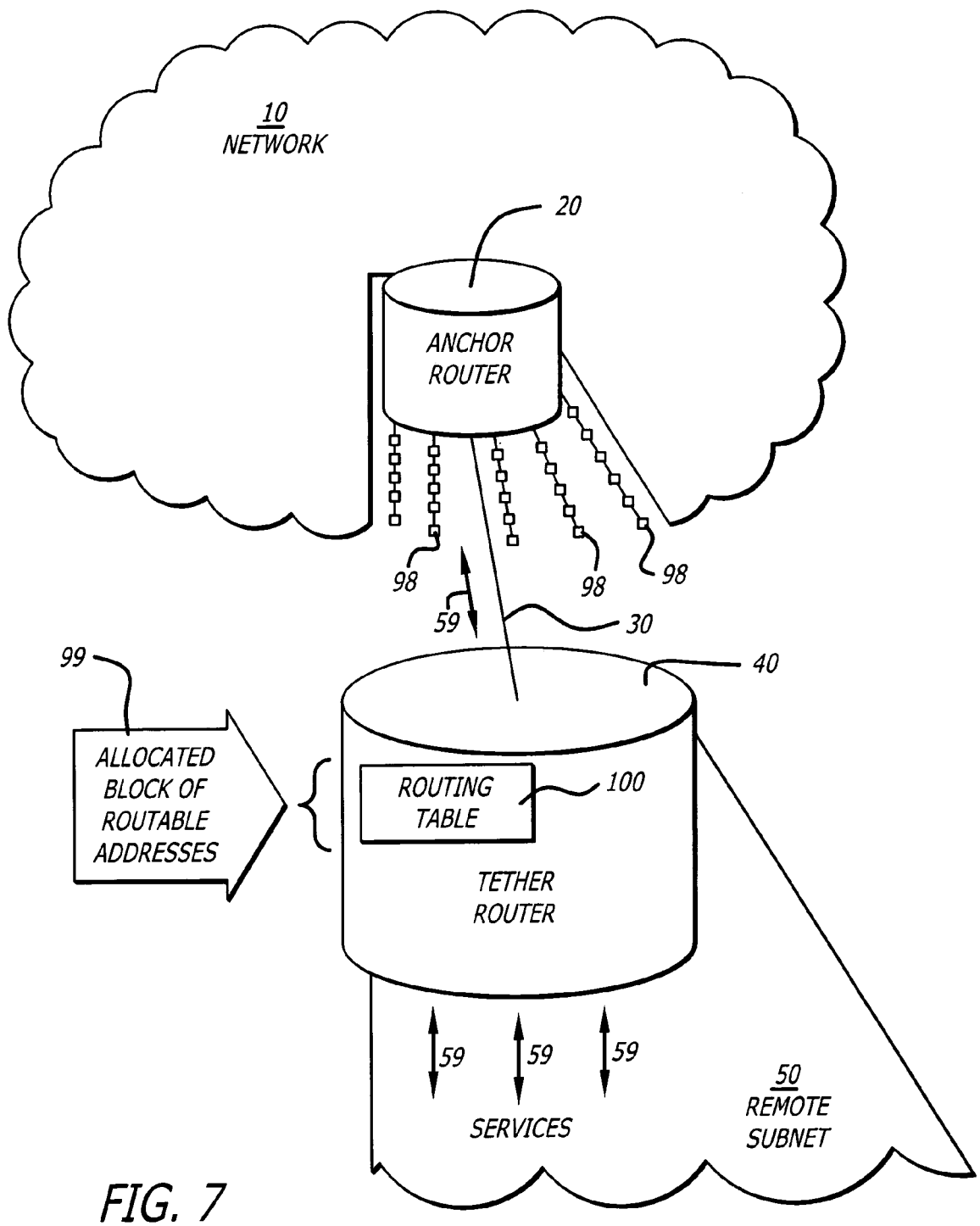
FIG. 7 is a drawing of the components of subnet relocation with another exemplary function of the anchor router in accordance with an embodiment of the present invention.

FIG. 7 illustrates another function of anchor router 20 in accordance with an embodiment: to coordinate services provided by tether router 40. Lines 59 show the flow of data during the coordination of services. The services at issue may reside at tether router 40, or on any node within subnet 50. In one embodiment, the services to be coordinated include DNS, web cache, DHCP, mail relay services, and the like.

Subnet Lease

Figure 8:
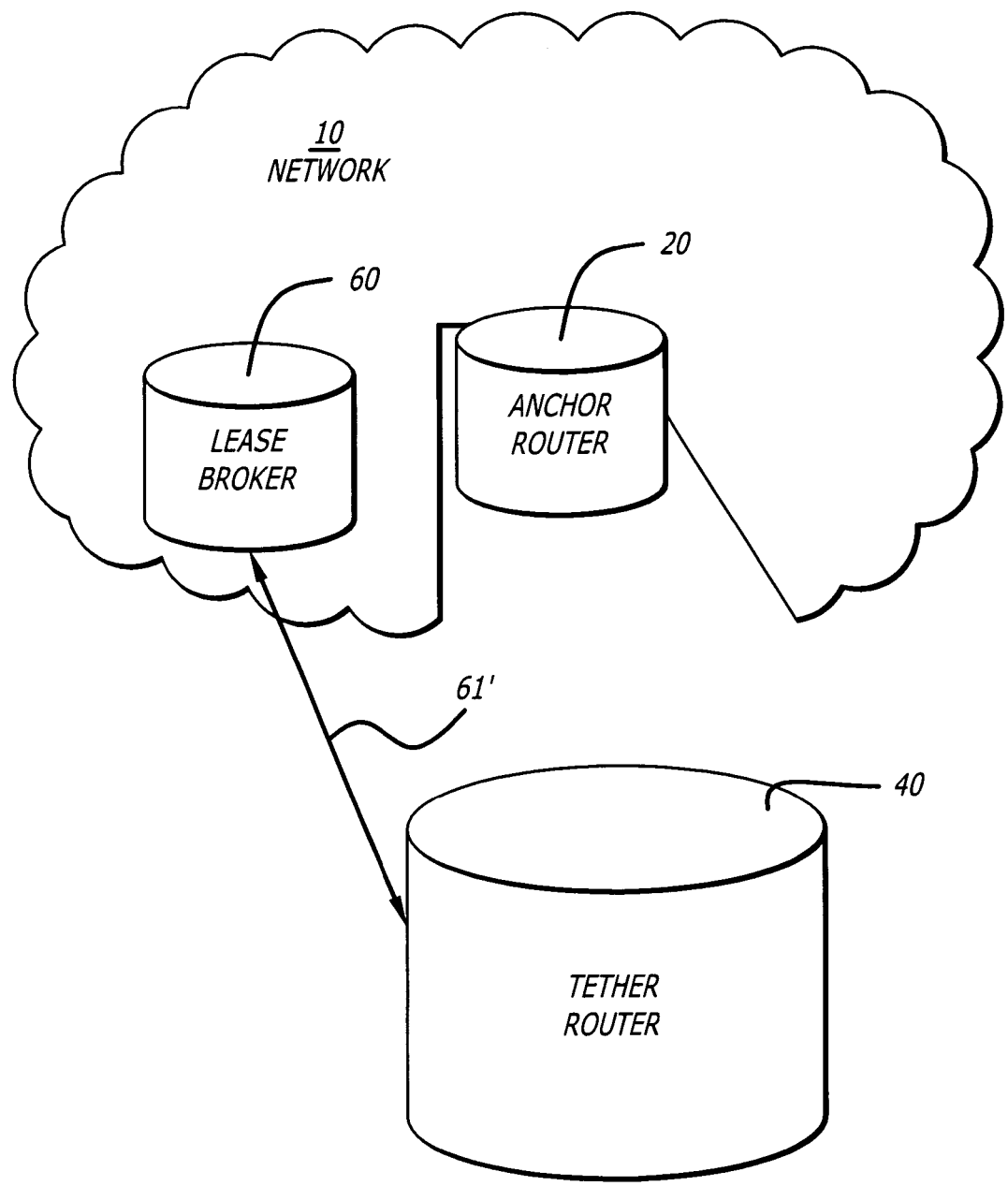
FIG. 8 is a depiction of a first phase of a subnet lease for subnet relocation.
Figure 9:
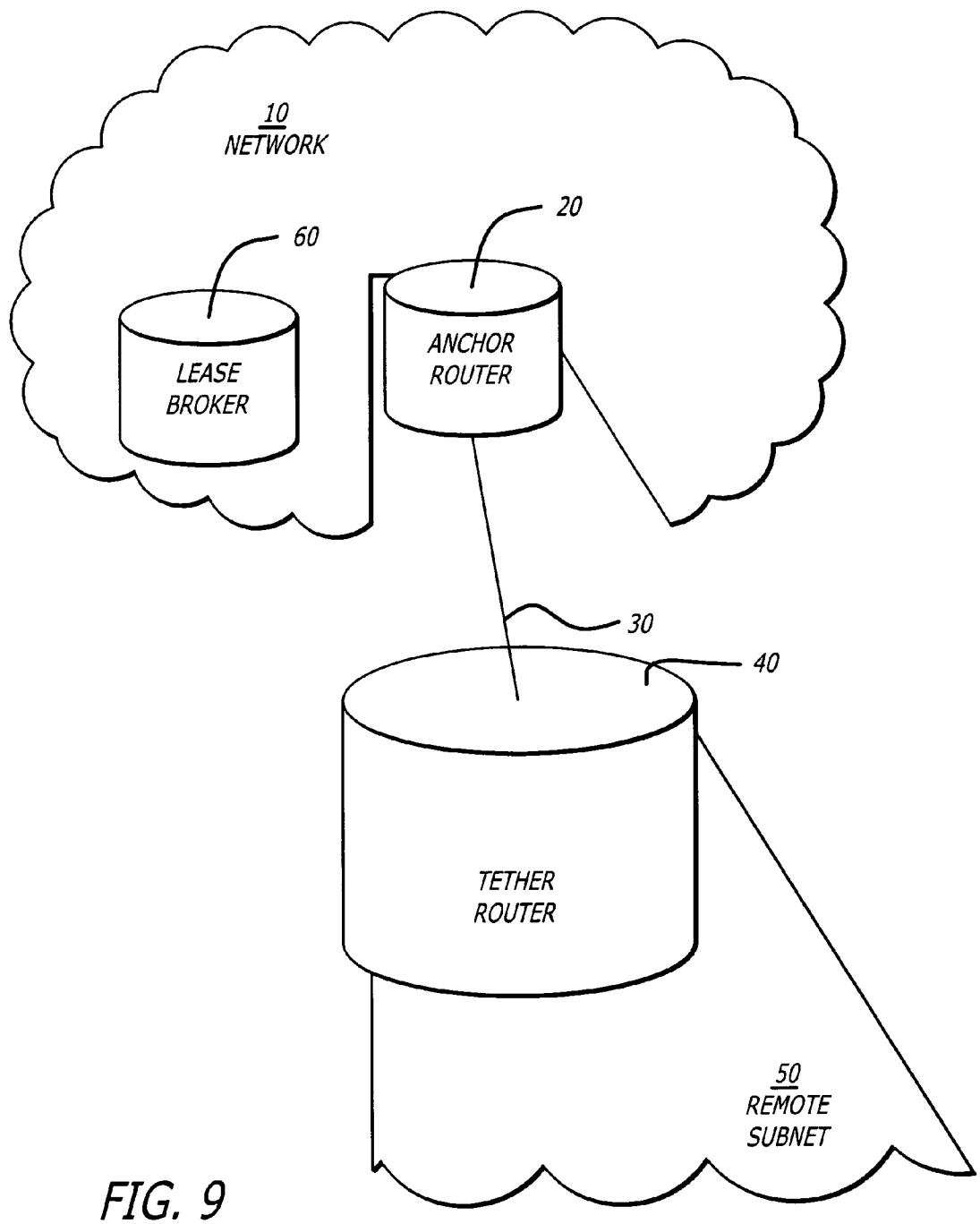
FIG. 9 is a depiction of a second phase of a subnet lease for subnet relocation.

In another embodiment, a subnet lease is performed. In other words, the delegation of the remote subnet is performed on demand. This embodiment adds a lease broker 60 to the system, as illustrated in FIG. 8. Subnet lease includes the following phases. First, tether router 40 contacts lease broker 60 to obtain a leased subnet. This communication is illustrated by line 61. Second, as shown in FIG. 9, tether router 40 and anchor router 20 thereupon connect via link 30, and are configured accordingly to establish new subnet 50. After this phase, services may be installed, or the minimum routing requirements for data to travel between the leased subnet and network 10 may be established. The mechanism for establishing a link (such as a tunnel) may be performed by the lease broker. The lease broker functionality may, but need not, reside on the same device or network as the anchor routing mechanism. In one embodiment, a block of addresses is leased by a lease broker such as a company with appropriate network equipment. The company may be in the business of leasing or allocating such addresses. Separate from the lease broker, a link (such as a tunnel) is then configured between the subnet comprising the block of addresses (or a portion thereof) and the anchor router coupled to the network from which direct communication is desired. The lease broker 60 is shown in this example as being connected to network 10; however, lease broker 60 need not be configured in this manner.

A single tether may rent blocks of addresses from multiple lease brokers to establish connections with multiple anchor routers. Alternatively, a tether router may rent several blocks from a single lease broker to establish a plurality of remote subnets. In other embodiments, multiple subnets may be leased in a single operation. Further, a single tether router according to one embodiment may rent blocks of addresses that correspond to multiple anchor routers. Networks running non-conflicting protocols can, in this illustration, be concurrently provided to a remote location. For example, a first network running an IPv4 protocol may be coupled to a first anchor and then to a tether via a first tunnel, and a second network running an IPv6 protocol may be coupled to a second anchor and then to the same tether via a second tunnel. Network communications can then be provided to the remote location using the resources and protocols of both networks.

Generally, the lease process encompasses certain parameters which may be negotiated between server and client. However, the specifics of tunnel establishment may vary widely depending on numerous factors. These design details are not necessary to the practice of the invention. Where a lease broker or rental site is involved, in general (a) the rental site and the client (such as a tether router) "agree" to the lease and (b) certain information is ultimately passed to the server (such as the anchor router) such that the server can configure its end of the tunnel. The client may negotiate certain parameters with the lease broker, including, for example (i) parameters regarding the block of addresses (such as the number of addresses), (ii) parameters concerning the services desired or necessary for the configuration (such as DNS or DHCP services, etc.), and (iii) parameters pertaining to the tunnel (such as any keys for encryption or any NONCE (nonsense random string) to commence the handshake procedure).

The handshake may in various embodiments take place over a secure channel. In one embodiment, TCP/SSL is used. The use of such protocols may, but need not, involve the client authenticating itself via a certificate or otherwise. A password may be used in certain embodiments to authorize the lease. Likewise, the server may, but need not, authenticate itself, such as through the use of a certificate as is known in the art.

After negotiating the parameters with the lease broker, the lease broker may communicate these parameters to the anchor site. These communications may take place over a secure channel. Additionally, as noted elsewhere in this specification, the lease broker may itself be a part of the anchor site, in which case the information need not be communicated. Instead, the anchor is simply triggered to commence its procedures (e.g., in software). After these steps are accomplished, tunnel setup is established in embodiments where the link is composed of a tunnel. Tunnel setup according to certain exemplary embodiments is discussed further below.

Tunnel Setup

If link 30 in FIGS. 1 through 9 is virtual, the link is a tunnel between anchor router 20 and tether router 40. A tunnel provides encapsulated data transfer over an existing communication path. In particular, a tunnel is a virtual path that enables one network to send its data via another network's connections. Tunneling works by encapsulating a network protocol within packets carried by the second network. An example of tunneling is Microsoft's PPTP technology which enables organizations to use the Internet to transmit data across a virtual private network. It performs this task by embedding its own network protocol within the TCP/IP packets carried by the Internet. For the purposes of this disclosure, a tunnel may include one or more physical links. Likewise, one or more virtual encapsulation tunnels may connect to an anchor or tether. The particulars regarding the number of tunnels depend on various factors and are typically network and configuration specific.

A tunnel suitable for subnet relocation does not require knowledge of any client endpoint information. For example, where the tether router 40 is considered to be the client, the tether router may reside behind a NAT device. In this example, tether router 40 would be inaccessible as an IP address, as would the subnet nodes to which tether router 40 may be coupled.

In one embodiment, a tunnel suitable for subnet relocation may include a heartbeat and automatic reconnect mechanism. In the latter embodiment, where the link is somehow corrupted or interrupted, the link can self re-establish. The tunnel is then configured to maintain its connection between the anchor router and tether router in spite of events that may temporarily produce a connectivity glitch, such as where electrical interference occurs or where an address parameter changes.

A tunnel need not be restricted to any particular protocol, and tunnels of all types of protocols with a variety of parameters are matters of design choice that do not depart from the scope of the present invention. While certain protocols may be advantageous for certain configurations or infrastructures, any suitable encapsulation protocol can be used for the tunnel. Exemplary protocols include, for example, IP, UDP, TCP, PPP, PPoE, GRE, PPTP, and others. Further, the tunnel may optionally incorporate various types of encryption protocols, such as IPsec of IP, a custom protocol, etc. As noted above, a tunnel may include one or more physical links or virtual links. Further, the tether router may be connected to a plurality of encapsulation tunnels, each of which may be connected to either the same or a different anchor router.

By establishing one or more tunnels and remote subnets, a programmer can isolate secure traffic running on the remote subnets from an underlying network that may carry unrelated or insecure traffic. For instance, where a user is at a hotel, the user may connect a tether router box to the hotel's network. Thereupon, the user may establish a tunnel back to an anchor router to enable secure communications from desired sites. The tunnel in this embodiment effectively uses the hotel's underlying physical network while isolating the traffic transmitted by or addressed to the remote subnet(s) from, e.g., access by the hotel or other individuals using the hotel's network who may not be authorized to access that traffic. The user may then connect the tether box through an Ethernet or other port to one or more remote devices, such as PCs, etc., for communication with the anchor sites via the tunnel(s). As noted elsewhere in this specification, in one embodiment the tunnels used are secure connections, such as by using IPsec, UDP-level encryption, or any appropriate encryption technique.

Figure 10A:
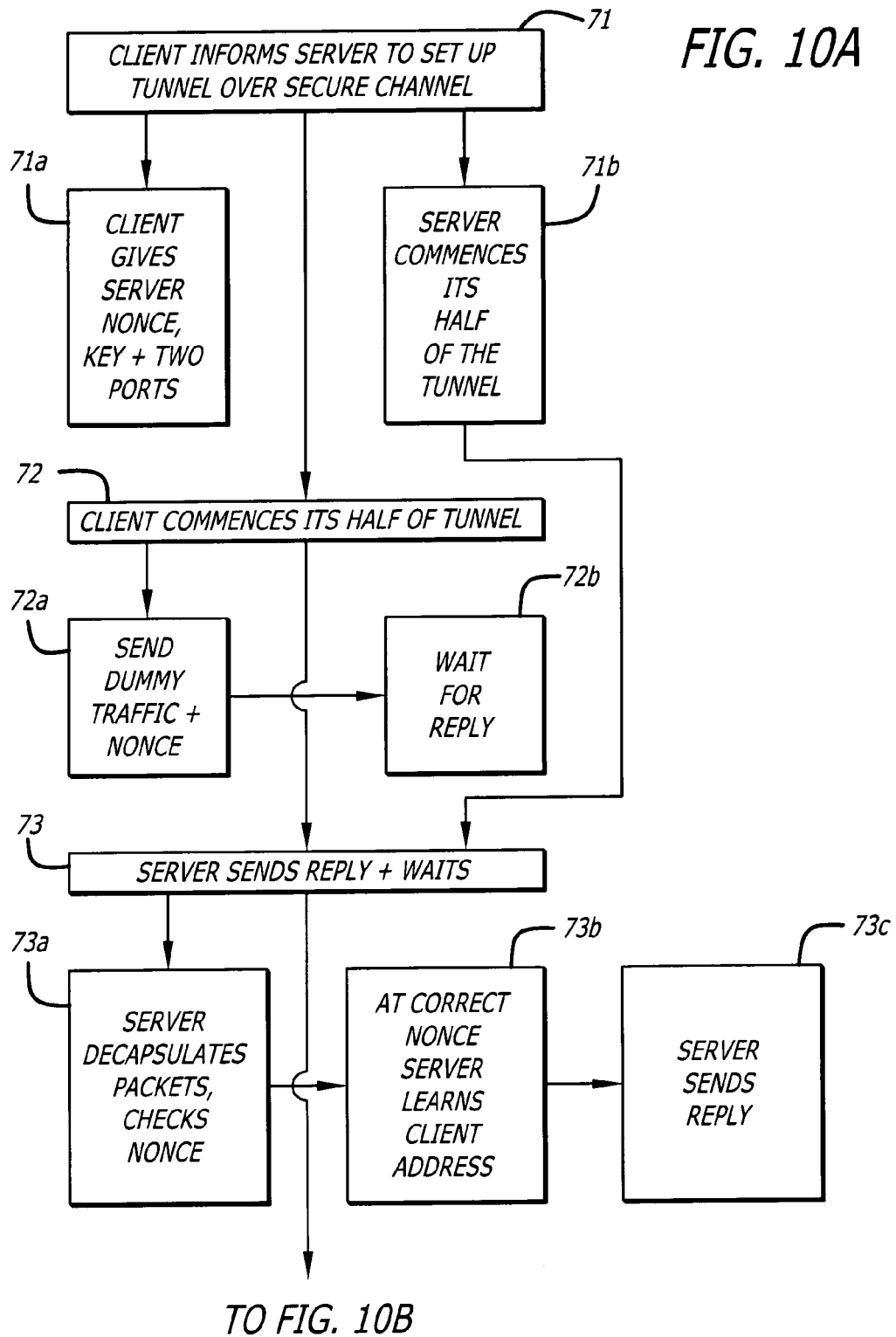
FIG. 10A and FIG. 10B depict a flow chart illustrating the establishment of a tunnel in accordance with an embodiment of the present invention.

Tunnel setup algorithms may vary widely. A tunnel setup algorithm according to an exemplary embodiment is depicted in flow chart form in FIGS. 10A-B. In this embodiment, UDP is chosen as the protocol to transmit packets over IP due to UDP's effectiveness at traversing NAT and similar devices.

The tunnel setup process may, as in this embodiment, commence with a request by the client to a server to set up a tunnel. In this example, at step 71 in FIG. 10A, a client (such as tether router 40) informs the server (such as anchor router 20) to set up a tunnel over a secure channel using Secure Sockets Layer (SSL) and a pre-shared secret (i.e., X.509 keys) (step 71). The client hands the server a NONCE (nonsense random string), a key to authenticate itself to the server, and a pair of keys used to secure the tunnel (step 71*a*). The client also chooses two ports for communication (one for the client and one for the server) (step 71*a*). The server could challenge its port, and provide an alternative port. Notably, these steps can be performed in myriad ways depending on the methodology chosen. For example, issues pertaining to which entity chooses which ports, the use of the specific encryption technology or the choice or use of keys and the method of identifying the entities are all matters of design choice that do not depart from the scope of the present invention.

Thereupon, the client commences its half of the tunnel (step 72). In particular, the client sends in the encapsulated dummy traffic (e.g., ping packets) over that tunnel containing the NONCE originally transmitted to the server (step 72*a*). The client thereupon waits for a REPLY signal from the server (step 72*b*).

Meanwhile, the server performs steps to commence its half of the tunnel (step 71*b*). The server is listening on the chosen port and decapsulates received packets (step 73). As the server decapsulates received packets, it checks their NONCE (step 73*a*). When it finds a packet with a NONCE corresponding to the NONCE submitted in step 71, the server checks the IP address and source port information contained within that packet. Using this method, the server learns the apparent IP address and source port of the packet sent by the client (step 73*b*). Notably, the IP address and source port information is labeled "apparent" because a NAT device or other service-obfuscating mechanism may alter both pieces of information. The server sends a REPLY signal to that address and port (step 73*c*). The server then waits for a REPLY ACK signal from the client.

Figure 10B:
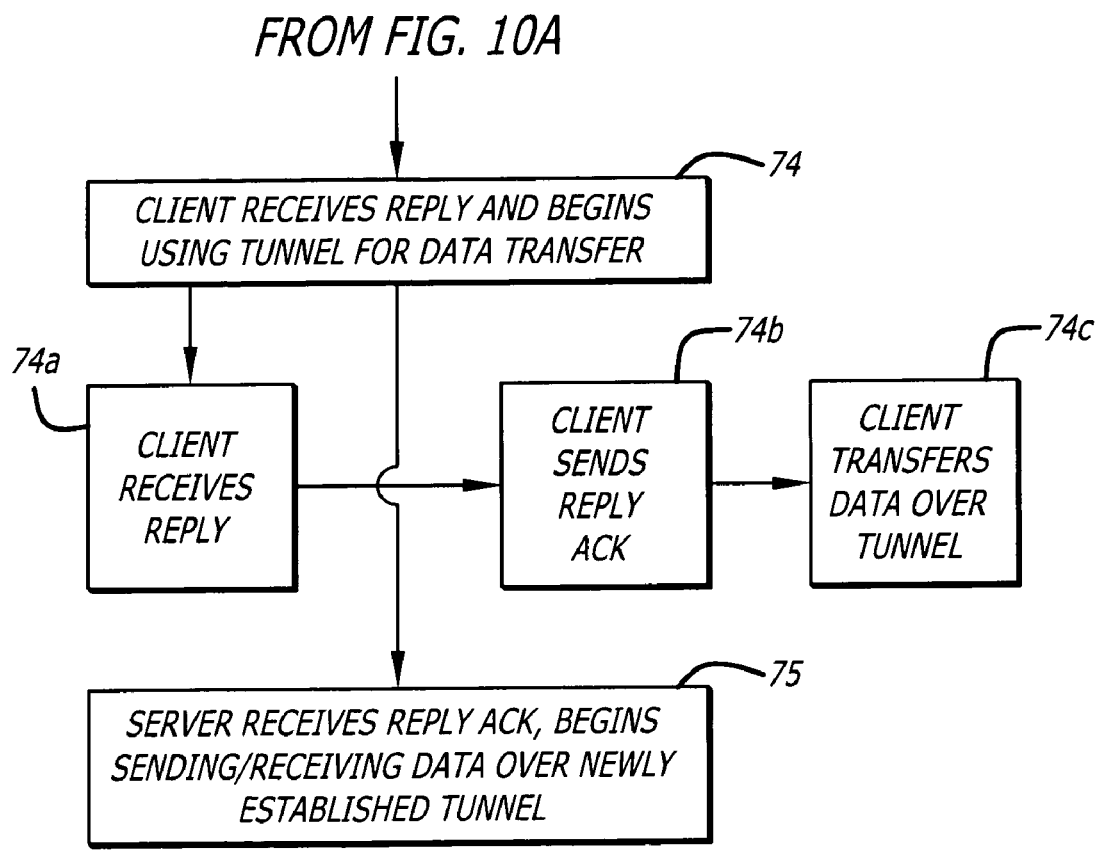

Referring next to FIG. 10B, the client receives the REPLY sent by the server and begins using its portion of the tunnel for data transfer (step 74). Specifically, after the client receives the REPLY (step 74*a*), the client terminates its generation of dummy traffic from step 72*a* and sends a REPLY ACK to the server (step 74*b*). The client then begins transferring data over the tunnel (step 74*c*).

The server receives the REPLY ACK from the client (step 75). At that point, a tunnel is established and the server can start receiving and transmitting data to and from the client over the tunnel (step 75).

Tunnel setup may be as simple as follows: In one scenario, the server listens on a particular port and waits for a NONCE from any address. The client transmits the NONCE to the server (The packet's outer address may change en-route, e.g., if a NAT is present in the path). When the server receives the NONCE, it concludes that this is the correct address for the client. At this point, after appropriate handshaking, communications over the tunnel may commence.

Regardless of the specific methodology of tunnel setup, a connection is established between the anchor and tether. The nature of that connection (whether it is secure, etc.) can be dictated by the needs of the application and the network configuration. Because a tunnel is established directly between the server (anchor router) and client (tether router) in the embodiment above, any NAT or other device obscuring network service or otherwise hiding IP address is traversed, and full routability exists between the two devices over the tunnel. Thus, a device on the subnet and/or coupled to the tether router can directly route data to and from a device on the network coupled to the anchor router. In one embodiment, each node that is part of the subnet coupled to the tether router corresponds to a unique IP address, and the subnet corresponds to a block (or portion of the block) of contiguous, fixed, IP addresses that are globally routable. (The subnet may also use certain addresses of the block for other purposes such as configuration.)

Notably, although the anchor and tether routers correspond to the server and client, respectively, in the example above, the anchor router need not be one device. For example, the anchor router may include a plurality of routers and/or computers, etc., and the tether router may include a plurality of routers and/or computers, etc., each for routing packets, performing services, and the like.

The lease broker 60 described in FIG. 8 on one hand, and the mechanism that configures the tunnel on the other, need not be one in the same. The functionality to set up the tunnel may reside in a separate box which may incorporate the tether router. In one embodiment, the tether router is compact and portable. The tether router may also exist as a stand-alone computer or PC. The lease broker 60 may, for example, be a company with a service on the Internet to rent blocks of fixed IP addresses. In such a case, an individual with a tether router box can rent a block of addresses, and then use the box to establish a private tunnel that enables the routing of information to and from the block of address back to the anchor router, i.e., the portion of the original network where communications otherwise would have been directed. The block of addresses essentially acts as an extension cord. For example, if an individual maintains a web site on a network in Kansas City, and she wishes to perform a demonstration in Hawaii on a private corporate intranet where the demonstration requires the use of services resident on the Kansas City web site, the individual can rent a block of IP addresses (from the corporation or an independent lease broker) in Hawaii, assign certain of the IP addresses to devices in Hawaii, and set up a private tunnel between the local IP addresses and the network in Kansas City. In so doing, the individual can run the presentation on the intranet in Hawaii and transparently obtain the services from her web site via the private tunnel and connected subnet. In addition, if third parties send information (e.g., e-mail) to the web site, the information can be transparently redirected to the remote location in Hawaii via the private tunnel.

FIG. 11 depicts an illustration of a configuration of a remote subnet 80 in accordance with an embodiment of the present invention. The remote subnet 80 is defined by the set of IP addresses 192.0.2.0 through 192.0.2.255, designated in FIG. 11 by the notation "192.0.2.0/24." In one embodiment, this block of contiguous IP addresses may have been leased from a lease broker, as described earlier in this specification.

In this example, the remote subnet 80 provides a set of hosts behind a NAT box. The subnet 80 and included hosts have a "real" Internet connection with "real" Internet host addresses. All externally-bound traffic on the subnet 80 is sent via the tether router 81 through a tunnel 87 to the anchor router 86. Traffic from anchor router 86 is thereby delivered to the Internet 83 through router 85. In this embodiment, a UDP protocol is used to transmit packets from tether router 81 to anchor router 86, because the UDP protocol typically enables traversal of the NAT box 82. It should be noted that the use of UDP is a matter of design choice and other protocols for tunnel 87 may be used without departing from the scope of the invention. Anchor router 86 may advertise to other networks that it is the default router for communications to be transmitted to nodes on subnet 80. Accordingly, all packets destined for subnet 80 and originating from the Internet 83 are routed to anchor router 86. There, the packets are properly encapsulated and possibly encrypted or authenticated (as desired) into UDP/IP format and transmitted over tunnel 87 to tether router 81, which properly decapsulates and decrypts or authenticates them (as needed) e.g., into TCP/IP, for transmission to the designated node(s) on subnet 80. It should be noted that router 85 must not have an alias in the leased block, e.g., 192.0.2.0/24, or the router 85 will not route packets to anchor router 86. This is because the nodes on the subnet 80 have the same alias. Anchor router 86 represents the point of contact between the Internet 83 and subnet 80, and also corresponds to the server-side of the tunnel.

While the number of ports and type of network interface on tether router 81 are largely a matter of design choice, in one embodiment, port 108 on tether router is a wide area network ("WAN") interface-based port, and port 107 is a local area network interface port such as an Ethernet port, etc. The tunnel 87 in this embodiment comprises a virtual connection between tether router 81 and anchor router 86.

Assuming that subnet 80 has a domain name entitled example.net, then DNS server 84 is configured to serve the example.net domain. Thus, nodes on the Internet that are configured to commence communications with a node on subnet 80 can perform a forward lookup on DNS server 84 to ascertain that node's IP address.

Exemplary Subnet Configuration

Following is an exemplary configuration of a remote subnet, configured using Unix™ network-based commands. It should be understood that the operating system, network-specific details, etc., may all vary widely and are not necessary to the practice of the invention. The example given includes a series of examples of code that may be used to configure the server-side (anchor router 86) and tunnel 87.

In this example, a block of IP addresses are leased to the client from 192.0.2.0 through 192.0.2.255. A description of the assignment of IP addresses in this embodiment is as follows:

192.0.2.0/24—rented block
10.0.0.6—tether router's interface IP address on the WAN (the address it "thinks" it is using)
172.16.0.55—tether router's packets appear to be sourced from
192.168.0.33—anchor router's IP address It is presumed that IP addresses 192.0.2.0/24, 172.16.0.55, and 192.168.0.33 are visible on and routable from the entire Internet. A portion of the allocated addresses are assigned to various resources and services, and UDP ports for the tunnel are identified:

192.0.2.1—tether router's allocated IP address
192.0.2.2—IP address of tether router side of the tunnel
192.0.2.3—IP address of anchor router side of the tunnel
192.0.2.4—virtual IP address of tether router side of the tunnel
192.0.2.5—virtual IP address of anchor router side of the tunnel
2882—tether port of the tunnel
2883—anchor port of the tunnel As is evident from this illustration, the fact that a block of addresses is allocated for use in a relocated network subnet does not require that all such addresses be actually assigned for use. Further, certain IP addresses of the block may be assigned to virtual devices, such as for the purpose of tunnel configuration or for other reasons. Depending on the subnet configuration and objectives for a given embodiment, these additional assignments of virtual addresses may or may not be performed.

Thereupon, a tunnel interface is set up, and configured appropriately, such as with the following commands:

```
# make a tunnel device with the appropriate wrappers
ifconfig ng0 192.0.2.2 192.0.2.3 netmask 255.255.255.0
udp_tunnel ng0 10.0.0.6:2882 192.168.0.33:2883
```

Generally, the "ifconfig" command allows the operating system to set up network interfaces and allow the user to view information about the configured network interfaces. In this example, "ng0" is a new interface on which tunneling software is being run. The "udp_tunnel" is a user-provided program that attaches to the interface (ng0) and uses the provided source (10.0.0.6) and destination (192.168.0.33) addresses, and provided source (2882) and destination (2883) UDP port numbers.

It may be necessary to traverse a firewall for the tunneled packets. Note that tunnel 87 effectively "punches a hole" in the NAT box 82, or other device such as a firewall, for traffic destined for nodes on subnet 80. Exemplary code for performing this configuration may be as follows:

```
# Punch a hole in the firewall for tunneled packets.
# Allow tunneled packets out
ipfw add 400 allow udp from me 2882 to 192.168.0.33 2883
# Allow tunneled packets in
ipfw add 401 allow udp from 192.168.0.33 2883 to me 2882
```

The tunnel setup and subnet configuration may then be completed:

```
# everything goes into the tunnel except things to the anchor
# which goes over the pre-existing DEFAULT_ROUTE
route add default -interface ng0
route add 192.168.0.33 DEFAULT_ROUTE
# Start pinging the server.
# $NONCE=the nonce
ping -p $NONCE 192.0.2.3
# when it succeeds . . .
# Create the IPIP tunnel inside the other tunnel
ifconfig gif0 192.0.2.4 192.0.2.5 netmask 255.255.255.0 tunnel 192.0.2.2 192.0.2.3
    setkey . . . (configure IPsec on that tunnel if desired)
# Default route points to the IPIP tunnel
route delete default
route add default -interface gif0
```

In addition to the above steps, commands may be performed to configure protection for the subnet. Such commands may, for example, accomplish the following procedures: (i) enable the transmission of all packets, including those to the WAN ISP, over the tunnel; (ii) prevent MTU blackholes; (iii) drop transited packets and forward only leased addresses; and (iv) commence the transmission of keepalive packets. In addition, the interface on the LAN side may be configured, and services may be set up on the local side.

Hence, all packets destined for subnet 80 (example.net) are routed to the anchor router 86 and to the tunnel 87. In particular, all packets destined for IP address 192.0.2.0 through 192.0.2.255 are passed to the tunnel interface configured above.

The connections to the subnet 80 can be just as easily disabled. The operations above are simply "undone" in the reverse order. The tunnel 87 may then be brought down, and the subnet is removed from the routing table of the anchor router 86. The NAT box 82 is restored to its previous configuration.

In another embodiment of the invention, a computing apparatus includes one or more processors, a plurality of ports, and routing functionality to perform two principal functions: (i) tether router and (ii) tunnel setup. The apparatus may be a stand-alone computer or PC, or a portable box with the appropriate circuitry and power interface. The routing functionality may include a standard router as known in the art. The ports may be used to connect to a network or directly to devices such as a laptop computer or a PDA, etc. The tunnel setup may be performed by software running on the one or more processors. Alternatively, one processor may be dedicated or hardwired to perform tunnel setup functions, whether alone or in conjunction with additional circuitry.

Figure 12:
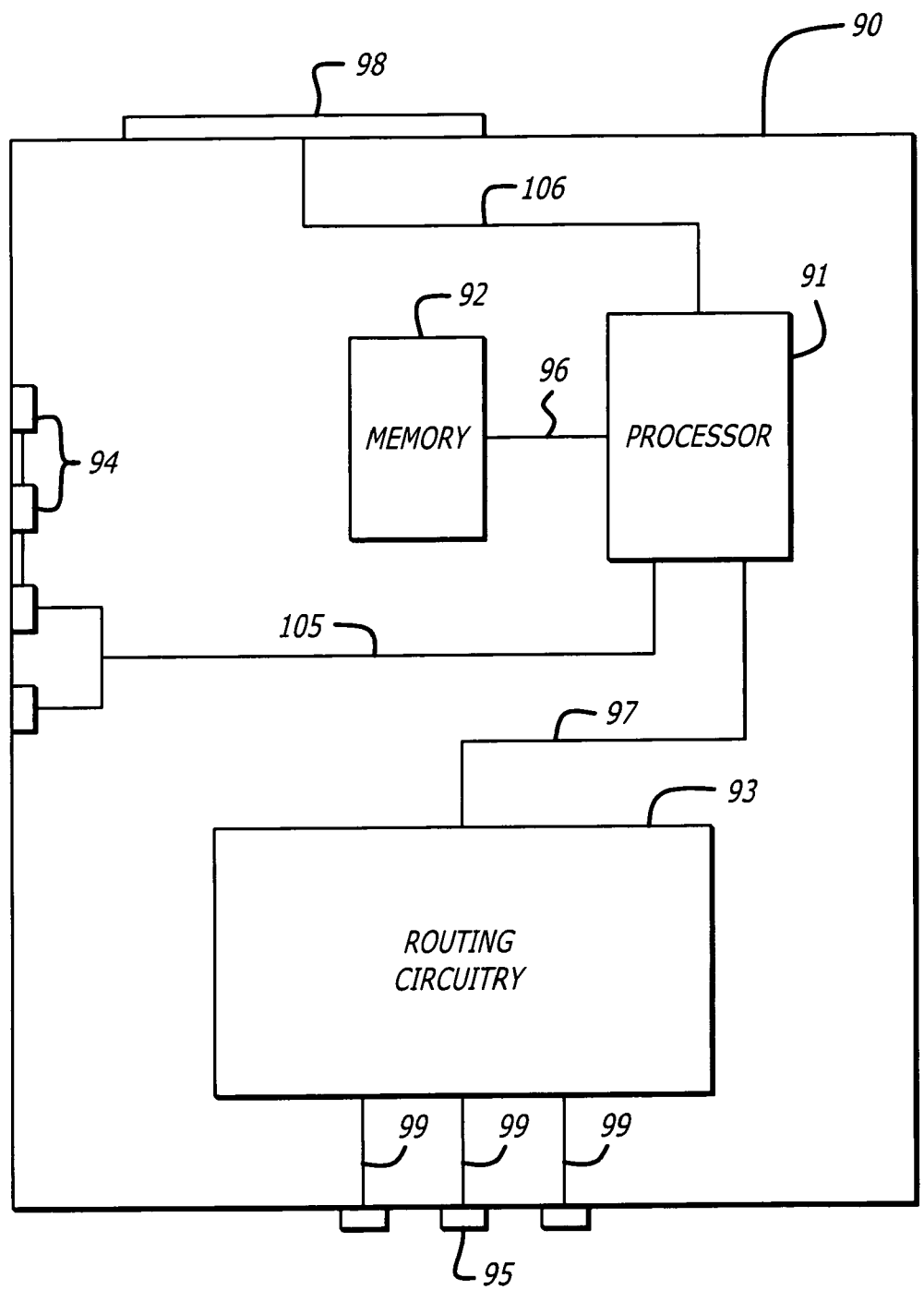
FIG. 12 is an illustration of a computing apparatus configured to provide the functionality of a tether router and to establish a tunnel to an anchor router.

FIG. 12 shows an exemplary apparatus 90 for providing tether router and tunnel setup functionality in accordance with an embodiment of the invention. The apparatus may be portable or fixed. A processor 91 resides on the apparatus 90 for running code stored in memory 92. The code is transmitted from memory 92 to the processor 91 via bus 96. Conventional routing circuitry is shown as block 93, which is coupled to ports 95 on apparatus 90. LED lights 94 may in one embodiment be used to show the status of the connections. Control panel 98 may contain switches, buttons, and a display panel (such as an LCD indicator) for user interface. Apparatus 90 also includes a connection 97 for transmitting communications to and from processor 91 and routing circuitry 93 and out to ports 95 through conductors 99. Processor 91 may communicate with LED lights 94 through connection 105, and with control panel 98 through connection 106. In an alternative embodiment (not shown), the apparatus may be coupled to a PC or other computer and the tunnel setup or other code is run on the PC instead of apparatus 90. The ports may be used to connect to a network, or to connect directly to a local computer or other device.

As in the example above, a user in Hawaii may like to run a presentation over a corporate intranet. Various services needed by the user to run the presentation reside at Internet sites in Kansas City. The intranet is behind a NAT mechanism that allocates hidden IP addresses to nodes on the corporate intranet. The user thereupon contacts a lease broker in Hawaii to obtain a block of addresses. Upon receiving appropriate compensation, the lease broker allocates a block of fixed, contiguous, IP addresses to the user. The lease broker in this embodiment is an independent entity, unrelated to the corporation with the intranet. The user has a portable apparatus 90 which incorporates a tether router. Using an existing network connection point such as a DSL line, the user couples a port 95 on the apparatus to the DSL line, using intervening circuitry if required. In this example, the user also has a laptop computer containing the presentation. The computer is coupled to another port 95 on the apparatus. Thereupon, the tether router functionality of the apparatus is configured, either manually through control panel 98 or automatically by code executed on processor 91 (or both), to attach to the nodes which correspond to the IP addresses allocated by the lease broker. Thereupon, a remote subnet is established, with apparatus 90 acting as tether router 40 from FIG. 1. The tether router may also be coupled directly to devices on the corporate intranet or to one or more routers which directly access the intranet.

Independently, a tunnel is established between the tether router and a router in Kansas City coupled to the user's sites (i.e., the anchor router). In one embodiment, the portable apparatus 90 includes functionality for setting up the tunnel. The tunnel setup may be performed by code executed on processor 91 and stored in memory 92. The tunnel is established between the tether router (part of apparatus 90) and the anchor router in Kansas City. (Alternatively, the tunnel may be configured via a computer connected to a port on a tether router 40 in FIG. 1.) At this point, the user can run the presentation with direct access to services located at the Austin sites. Communications to and from the sites are sent via the tunnel to the remote subnet, traversing the NAT associated with the intranet.

In an alternative embodiment, the tether router and tunnel setup functionality may be embodied in a stand-alone PC or other computer. The PC may use a web based configuration that enables a user to automatically connect to and configure the remote subnet. The PC may be optimized to include a DHCP server, DNS server, web cache, etc. Once the tether router and tunnel are set up, clients running a diversity of operating systems (such as Unix or Windows) can simply plug to the tether router and operate seamlessly in the subnet environment using a web-based interface.

Although particular embodiments of the invention have now been described, it is of course to be understood that the invention is applicable to a broad variety of other embodiments. In short, the invention is limited solely by the claims that now follow.

What is claimed is:

1. A method for communicating with a plurality of devices behind the private side of a NAT, each through a different publicly routable network address, comprising:

issuing a request from a client behind the private side of the NAT to a server on the public side of the NAT for the publicly routable network addresses;

delivering the request from the client to the server through the NAT;

receiving the publicly routable network addresses at the client from the server through NAT;

configuring a router behind the private side of the NAT, named herein a tether router, to associate each of the devices behind the private side of the NAT with at least one of the publicly routable network addresses;

configuring a tunnel through the NAT between the tether router and a router on the public side of the NAT, named herein an anchor router, through which packets can be exchanged between the tether router and the anchor router without being translated by the NAT;

receiving packets at the tether router from the anchor router encapsulated within the tunnel through the NAT addressed to at least one of the publicly routable network addresses; and forwarding the received packets from the tether router to the device that is associated within the tether router to the at least one publicly routable network address to which the packets are addressed, whereby communications to the plurality of devices behind the private side of the NAT are effectuated using publicly routable network address.

2. The method of claim 1 wherein the publicly routable network addresses are contiguous.

3. The method of claim 1 where the publicly of routable network addresses are leased.

4. The method of claim 1 wherein the tunnel is configured to automatically reconnect in response to a change in an address associated with one of the components of the tunnel.

5. A method for communicating with a plurality of devices behind the protected side of a firewall, each through a different unprotected network address, comprising:

issuing a request from a client behind the protected side of the firewall to a server on the unprotected side of the firewall for the unprotected network addresses;

delivering the request from the client to the server through the firewall;

receiving the unprotected network addresses at the client from the server through firewall;

configuring a router behind the protected side of the firewall, named herein a tether router, to associate each of the devices behind the protected side of the firewall with at least one of the unprotected network addresses;

configuring a tunnel through the firewall between the tether router and a router on the unprotected side of the firewall, named herein an anchor router, through which packets can be exchanged between the tether router and the anchor router without being translated by the firewall;

receiving packets at the tether router from the anchor router encapsulated within the tunnel through the firewall addressed to at least one of the unprotected network addresses; and forwarding the received packets from the tether router to the device that is associated within the tether router to the at least one unprotected network address to which the packets are addressed, whereby communications to the plurality of devices behind the protected side of the firewall are effectuated using unprotected network address.

6. The method of claim 5 wherein the unprotected network addresses are contiguous.

7. The method of claim 5 where the unprotected network addresses are leased.

8. The method of claim 5 wherein the tunnel is configured to automatically reconnect in response to a change in an address associated with one of the components of the tunnel.

9. A system for communicating with a plurality of devices behind the private side of a NAT, each through a different publicly routable network address, comprising:

a NAT a client configured to:
  issue a request behind the private side of the NAT to a server on the public side of the NAT for the publicly routable network addresses;
  deliver the request from the client to the server through the NAT;
  receive the publicly routable network addresses at the client from the server through NAT;

a router behind the private side of the NAT, named herein a tether router, configured to:
  associate each of the devices behind the private side of the NAT with at least one of the publicly routable network addresses;
  configure a tunnel through the NAT to a router on the public side of the NAT, named herein an anchor router, through which packets can be exchanged between the tether router and the anchor router without being translated by the NAT;
  receive packets from the anchor router encapsulated within the tunnel through the NAT addressed to at least one of the publicly routable network addresses and
  forward the received packets to the device that is associated to the at least one publicly routable network address to which the packets are addressed, whereby the NAT, client, and tether router are configured such that communications to the plurality of devices behind the private side of the NAT are effectuated using publicly routable network address.

10. The system of claim 9 wherein the tether router is configured to automatically reconnect in response to a change in an address associated with one of the components of the tunnel.

11. A system for communicating with a plurality of devices behind the protected side of a firewall, each through a different unprotected network address, comprising:

a firewall;

a client configured to:
  issue a request behind the protected side of the firewall to a server on the unprotected side of the firewall for the unprotected network addresses;
  deliver the request from the client to the server through the firewall;
  receive the unprotected network addresses at the client from the server through firewall;

a router behind the protected side of the firewall, named herein a tether router, configured to:
  associate each of the devices behind the protected side of the firewall with at least one of the unprotected network addresses;
  configure a tunnel through the firewall to a router on the unprotected side of the firewall, named herein an anchor router, through which packets can be exchanged between the tether router and the anchor router without being translated by the firewall;
  receive packets from the anchor router encapsulated within the tunnel through the firewall addressed to at least one of the unprotected network addresses; and forward the received packets to the device that is associated to the at least one unprotected network address to which the packets are addressed, whereby the firewall, client, and tether router are configured such that communications to the plurality of devices behind the protected side of the firewall are effectuated using unprotected network address.

12. The system of claim 11 wherein the tether router is configured to automatically reconnect in response to a change in an address associated with one of the components of the tunnel.

* * * * *

UNITED STATES PATENT AND TRADEMARK OFFICE
CERTIFICATE OF CORRECTION

PATENT NO. : 7,653,746 B2  Page 1 of 1
APPLICATION NO. : 10/632249
DATED : January 26, 2010
INVENTOR(S) : Touch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1087 days.

Signed and Sealed this

Twenty-eighth Day of December, 2010

David J. Kappos
*Director of the United States Patent and Trademark Office*